United States Patent [19]

Marshall

[11] Patent Number: 5,065,699
[45] Date of Patent: Nov. 19, 1991

[54] MOBILE PET PROTECTION CAGE

[76] Inventor: Shelly Marshall, Box 766, Tok, Ak. 99780

[21] Appl. No.: 444,520

[22] Filed: Dec. 1, 1989

[51] Int. Cl.⁵ ............................................. A01K 31/00
[52] U.S. Cl. .................................................... 119/17
[58] Field of Search ............... 119/15, 17, 19; 135/88, 135/93; 296/37.6, 24.1, 24.2, 156, 158, 164

[56] References Cited

U.S. PATENT DOCUMENTS

| | | | |
|---|---|---|---|
| 2,897,781 | 8/1959 | Olson | 119/15 |
| 3,249,382 | 5/1966 | Swithenbank | 296/37.6 X |
| 3,354,891 | 11/1967 | Brown | 135/88 |
| 3,485,522 | 12/1969 | Reinarts | 296/24.1 |
| 3,515,426 | 6/1970 | Gerber | 135/88 X |
| 3,727,972 | 4/1973 | Beck | 135/88 X |
| 3,879,080 | 4/1975 | Freeman | 296/24.1 |
| 4,103,956 | 8/1978 | Faulstich | 296/24.1 X |
| 4,157,201 | 6/1979 | Collins et al. | 296/156 |
| 4,496,184 | 1/1985 | Byrd et al. | 296/156 X |
| 4,546,728 | 10/1985 | May | 119/19 |
| 4,607,876 | 8/1986 | Reed | 135/88 X |
| 4,803,951 | 2/1989 | Davis | 119/19 |
| 4,819,582 | 4/1989 | Lichvar | 119/17 |

Primary Examiner—Gene Mancene
Assistant Examiner—R. Thomas Price
Attorney, Agent, or Firm—Lisa & Lisa

[57] ABSTRACT

A mobile pet protection cage that attaches to the bed of a pickup truck in a manner to allow an animal to move between the truck cab and the cage through the back cab window. The cage may be designed for any size truck bed and for large or small animals. The cage may be detachably secured to the truck.

12 Claims, 2 Drawing Sheets

MOBILE PET PROTECTION CAGE

BACKGROUND OF THE INVENTION

This invention pertains to pet protection cages, and in particular, to a mobile pet protection cage that attaches to the bed of a pickup truck and provides a means for an animal to move between the truck cab and the cage.

Conventional pet protection cages merely enclose the pet in a typically square housing. The cage is usually set in the bed of a truck to transport the animal. The animal is not free to move anywhere outside the confines of the cage and is protected from the elements only by the cage housing. Additionally, since prior art cages are simply set unsecured on the truck bed, and the animal is immobilized by the cage, severe peril exists for the animal should the cage be jarred off of the truck either by impact or harsh road conditions.

SUMMARY OF THE INVENTION

It is, therefore, an object of the present invention to provide a mobile pet protection cage that is completely open to the back of the cab allowing an animal to crawl between the cab and the cage through an open cab back window.

It is an additional object of the present invention to provide a mobile pet protection cage that can be securely attached to the truck by latches that can also be released to allow removal of the cage from the bed.

It is still an additional object of the present invention to provide a mobile pet protection cage that has either sliding or hinge doors at the back that permit the animal to enter the cage from the truck bed.

These and other objects and advantages of the present invention are achieved by a mobile pet protection cage that attaches to a motor vehicle pickup truck bed flush against the back of the cab and is completely open to the back of the cab. The cage may be designed for large and small animals and to fit any size truck bed. The cage is preferably made of light weight mesh material through which the driver can see but through which the animal cannot chew. The cage is securely attached to the truck by connection means which also allow it to be easily removed from the truck.

The objects and advantages described above will become apparent to those skilled in the art upon consideration of the accompanying specifications and drawings.

BRIEF DESCRIPTION OF THE DRAWINGS

The above mentioned and other features and objects of the present invention and the manner of attaining them will become more apparent and the invention itself will be best understood by reference to the following description of an embodiment of the invention taken in conjunction with the accompanying drawings wherein.

DESCRIPTION OF THE PREFERRED EMBODIMENT

Figure 1:
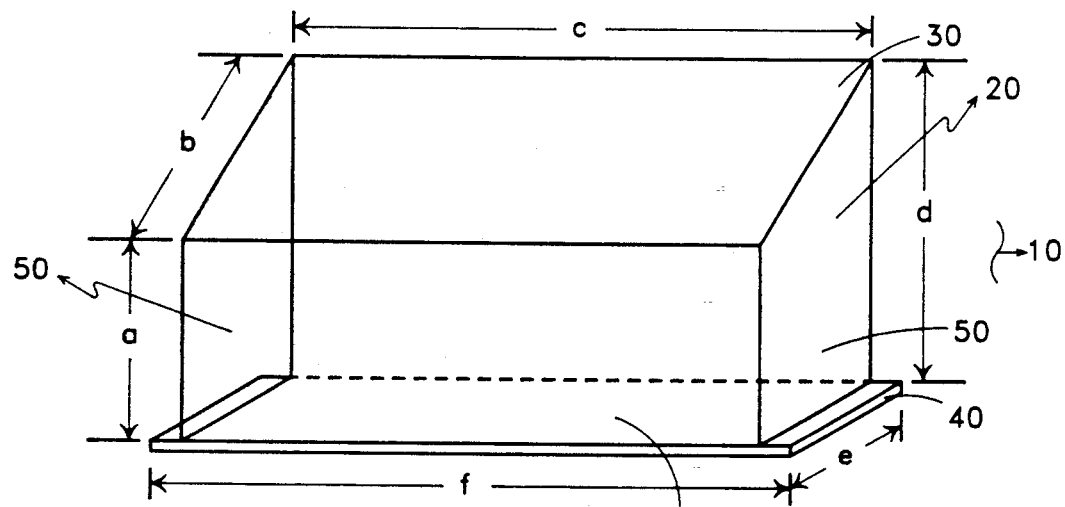
FIG. 1 is a schematic diagram showing a mobile pet protection cage designed for small animals in accordance with the present invention.

Referring specifically to the drawings, FIG. 1, is a schematic diagram of a mobile pet protection cage of the present invention, generally labelled 10, and designed for small animals. Front plane 20 of cage 10 is completely open. Top plane 30 slants downward from the top of the cab. Bottom plane 40 is fabricated from wood, aluminum or any other light but sturdy material that will support a small animal. Bottom plane 40 is approximately three inches longer than cage 10 so that cage 10 rests on the bottom plane. Top plane 30, side plane 50 and back plane 60 are fabricated from hollow tube stainless steel mesh, aluminum, plastic or any other light weight material through which the driver is able to see but through which the animal cannot chew. In addition, a sliding or hinge door (not shown) may be added to back plane 60 so the animal may enter cage 10 from the truck bed. Exemplary dimensions are also shown in FIG. 1. Top plane 30 is 56 inches long and 18 inches wide. Bottom plane 40 is approximately 59 inches long and 16 inches wide. Side planes 50 are 16 inches wide, 10 inches high on the back edge adjacent to back plane 60 and approximately 18.25 inches high on the front edge adjacent to front plane 20. Back plane 60 is 56 inches long and 10 inches high. It should be apparent that these dimensions can be varied.

Figure 2:
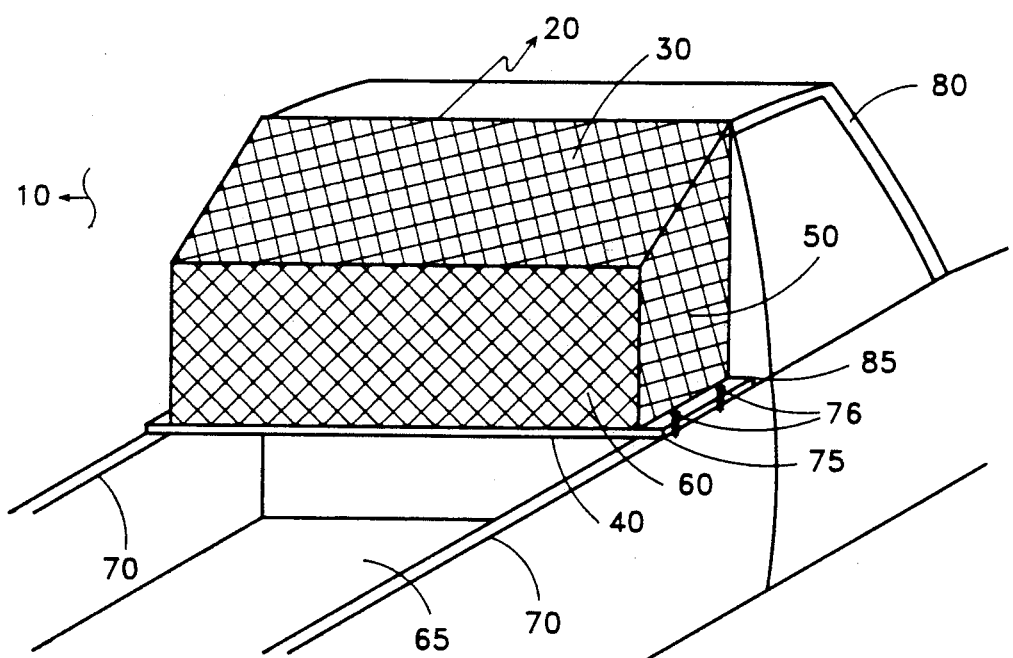
FIG. 2 is an oblique perspective of the small animal cage of FIG. 1 shown attached to truck bed sides.

Referring specifically to FIG. 2, an illustration of cage 10 shown in FIG. 1 is demonstrated attached to a truck bed 65. Bottom plane 40 rests on the top of truck bed walls 70. Open front end 20 of cage 10 is flush against the back of truck cab 80. Cage 10 can be detachably mounted to bed walls 70 by any conventional attachment means that permit both secure attachment of cage 10 to the truck and also easy release of cage 10 from the truck for removal. Examples of such attachment means as screws 76 or U-shaped latches pins, (not shown) may be utilized to attach cage 10 to the truck. One effective area of attaching cage 10 to the truck is at the four corners of bottom plane 40. Corners 75 and 85 can be seen in FIG. 2. Of course, attachment of cage 10 to the truck can also be achieved by securing the four corners of front plane 20 to the back of truck cab 80. The attachment of cage 10 to the truck ensures that the cage does not slide which would result in injury to the pet inside. Truck cab 80 has a back window (not shown) that slides open. Thus, when the window is open, the animal can move freely between cab 80 and cage 10.

The top plane 30 slants downward and rearward from the top of the cab 80 for non-interference during turns with overhanging and adjacent wall portions of a trailer mounted to a fifth wheel hookup (not shown) typically installed in the bed 65 of the truck.

Figure 3:
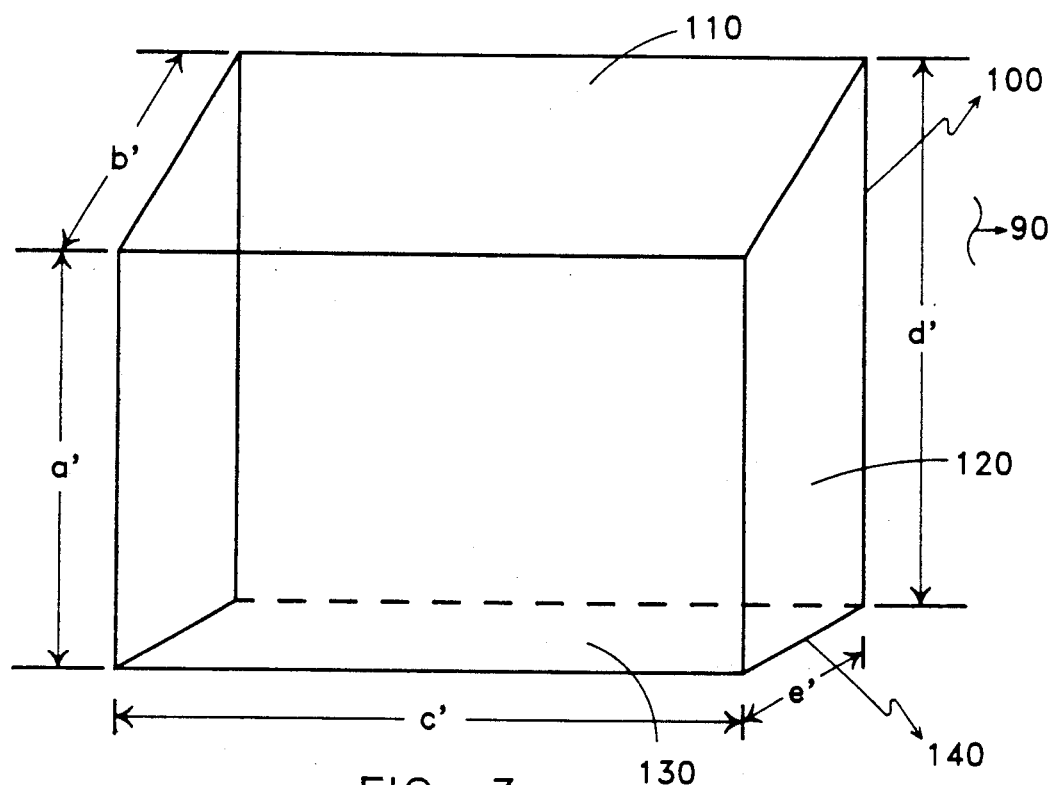
FIG. 3 is a schematic diagram showing a mobile pet protection cage designed for large animal in accordance with the present invention.

Referring specifically to FIG. 3, a schematic diagram of the mobile pet protection cage 90 designed for larger animals is shown, FIG. 3 is identical to FIG. 1 with the exception of its dimensions and its numeric references. Once again, front plane 100 of cage 90 is completely open. Top plane 110 slants downward and rearward from the top of the cab. Top plane 110, side planes 120 and back plane 130 are fabricated from hollow tube stainless steel mesh, aluminum, plastic or any other light material through which the driver can see but through which the animal cannot chew. Bottom plane 140 is completely open allowing the animal to stand directly on the truck bed floor. In addition, a sliding or hinge door may be added to back plane 130 so the animal can enter cage 90 from the truck bed. Exemplary dimensions suitable for larger animals are also shown in FIG. 3. Side planes 120 are 16 inches wide, 26 inches high on the back edge adjacent to back plane 130 and approximately 34.25 inches high on the front edge adjacent to front plane 100. Back plane 130 is 56 inches long and 26 inches high.

Figure 4:
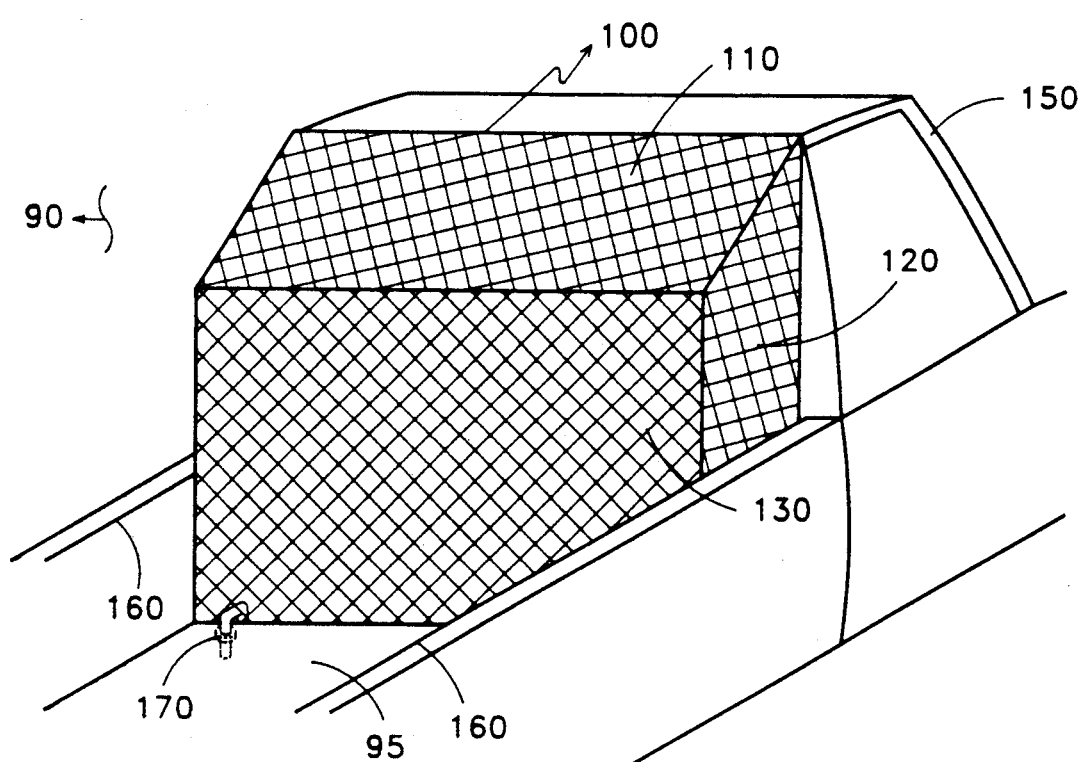
FIG. 4 is an oblique perspective of the large animal cage of FIG. 3 shown attached to a truck bed.

Referring specifically to FIG. 4, an illustration of animal cage 90 of FIG. 3 is shown attached to truck bed 95. This drawing is comparable to FIG. 2 but in larger dimensions. Side planes 120 and back plane 130 extend to the floor of the truck bed 95. Open front plane 100 is flush against the back of the truck cab 150. Cage 90 may be attached to bed walls 160 by any conventional attachment means that permit both secure attachment of cage 90 to the truck and also easy release of cage 90 from the truck for removal. Attachment means such as J-bolt and nut means 170, or U-bolts or screws (not shown) may be used to attach cage 90 to bed 95. Truck cab 150 has a back window (not shown) that slides open. Thus, when the window is open, the animal may move freely between cab 150 and cage 90.

What has been provided, therefore, is a mobile pet protection cage that allows an animal to move freely through a truck cab window between the cage and the cab. The cage is designed for different size pickup beds and for large and small animals. The cage designed for smaller animals rests on the truck bed walls. The cage designed for larger animals extends to the truck bed floor. The cage may be made of a light weight material through which the driver is able to see but through which the animal cannot chew. A sliding or hinge door may be placed in the back of the cage so the animal may enter the cage from the truck bed. The cage is detachably secured to the truck by means such as conventional latches that allow secure fastening of the cage to the truck and also allow easy release of the cage from the truck for removal.

While specific embodiments of this invention have been shown and described, further modifications and improvements will occur to those skilled in the art. For example, although exemplary dimensions have been shown for the large animal cage and small animal cage, other dimensions could be used. The cage dimensions will be determined by the truck cab it is intended to fit. Furthermore, while described as top, bottom and side "planes", the components of the cage disclosed herein may easily be given curved dimensions if important for aerodynamics, for example. Additionally, the "front plane" is in actuality an open area to allow an animal to enter and exit the truck cab when the truck cab window is open. I desire it to be understood, therefore, that this invention is not limited to the particular form shown and I intend to cover all modifications which do not depart from the spirit and scope of the invention.

What is claimed is:

1. A mobile pet animal protection cage for use in a pickup truck having an uncovered flat bed, a cab having a rear wall and a sliding rear window in said rear wall, said cage comprising:

first, second, third, fourth, fifth and sixth boundaries defining surface planes which enclose a volume between said cab rear wall and said flat bed whereby said volume is accessible by a pet to and from said cab when said sliding rear window is open;

said sixth boundary facing and adjacent said rear wall and having an opening aligned with said rear window, said first boundary facing and adjacent said flat bed;

said second, third, fourth and fifth boundaries being made of mesh material through which the driver can see but through which the animal cannot chew; and means for detachably securing said cage to said truck.

2. A mobile pet animal protection cage for use in a pickup truck having an uncovered flat bed, a cab having a rear wall and a sliding rear window in said rear wall, said cage comprising:

first, second, third, fourth, fifth and sixth boundaries defining surface planes which enclose a volume between said cab rear wall and said flat bed whereby said volume is accessible by a pet to and from said cab when said sliding rear window is open;

the sixth boundary facing and adjacent said rear wall and having an opening aligned with said rear window, the first boundary of said cage being the bottom boundary comprising a platform of sturdy material having a flat upper surface upon which cage sidewalls are supported, said platform extending across and resting on truck bed walls to be above the flat bed;

said second, third, fourth and fifth boundaries being made of mesh material through which the driver can see but through which the animal cannot chew; and means for detachably securing said cage to said truck.

3. A mobile pet protection cage according to claim 1 wherein back and side boundaries extend to a floor of said cab and a bottom boundary of said cage is said cab floor.

4. A mobile pet protection cage according to claim 1 or 2 wherein said cage is made of a mesh formed from stainless steel.

5. A mobile pet protection cage according to claim 1 or 2 wherein said cage is made of aluminum.

6. A mobile pet protection cage according to claim 1 or 2 wherein said cage is made of a plastic material.

7. A mobile pet protection cage according to claim 1 or 2 wherein a top plane slants downward and rearward from the top of the cab.

8. A mobile pet protection cage according to claim 7 wherein the slanted top plane intersects a back plane along a line that is sufficiently near the truck bed to avoid interference during turns with any overhanging and adjacent wall portions of a trailer that is adapted to be towed by a fifth wheel hookup on the bed of the truck.

9. A mobile pet protection cage according to claim 1 or 2 wherein said boundaries which serve as a top plane, as side planes and as a back plane are all fabricated from a light weight mesh material.

10. A mobile pet animal protection cage according to claim 1 wherein the first boundary is open.

11. A mobile pet animal protection cage for use in a pickup truck having an uncovered flat bed, a cab having a rear wall and a sliding rear window in said rear wall, said cage comprising:

first, second, third, fourth and fifth boundaries having surfaces which enclose a volume between said cab rear wall and said flat bed whereby said volume is accessible by a pet to and from said cab when said sliding rear window is open and said boundaries are aligned to fit said truck;

the fifth boundary being the top boundary which slants downward and rearward from the top of the cab;

said cage being made of mesh material through which the driver can see but through which the animal cannot chew; and means for detachably securing said cage to said truck.

12. A mobile pet protection cage according to claim 11 wherein the slanted top plane intersects a back plane along a line that is sufficiently near the truck bed to avoid interference during turns with any overhanging and adjacent wall portions of a trailer that is adapted to be towed by a fifth wheel hookup on the bed of the truck.

* * * * *

UNITED STATES PATENT AND TRADEMARK OFFICE
CERTIFICATE OF CORRECTION

PATENT NO. : 5,065,699

DATED : November 19, 1991

INVENTOR(S) : Shelly Marshall

It is certified that error appears in the above-identified patent and that said Letters Patent is hereby corrected as shown below:

Column 4, line 36, change "cab" to --bed-- in both occurrences.

Signed and Sealed this

Twenty-third Day of March, 1993

Attest:

STEPHEN G. KUNIN

Attesting Officer

Acting Commissioner of Patents and Trademarks